United States Patent Office 3,314,864
Patented Apr. 18, 1967

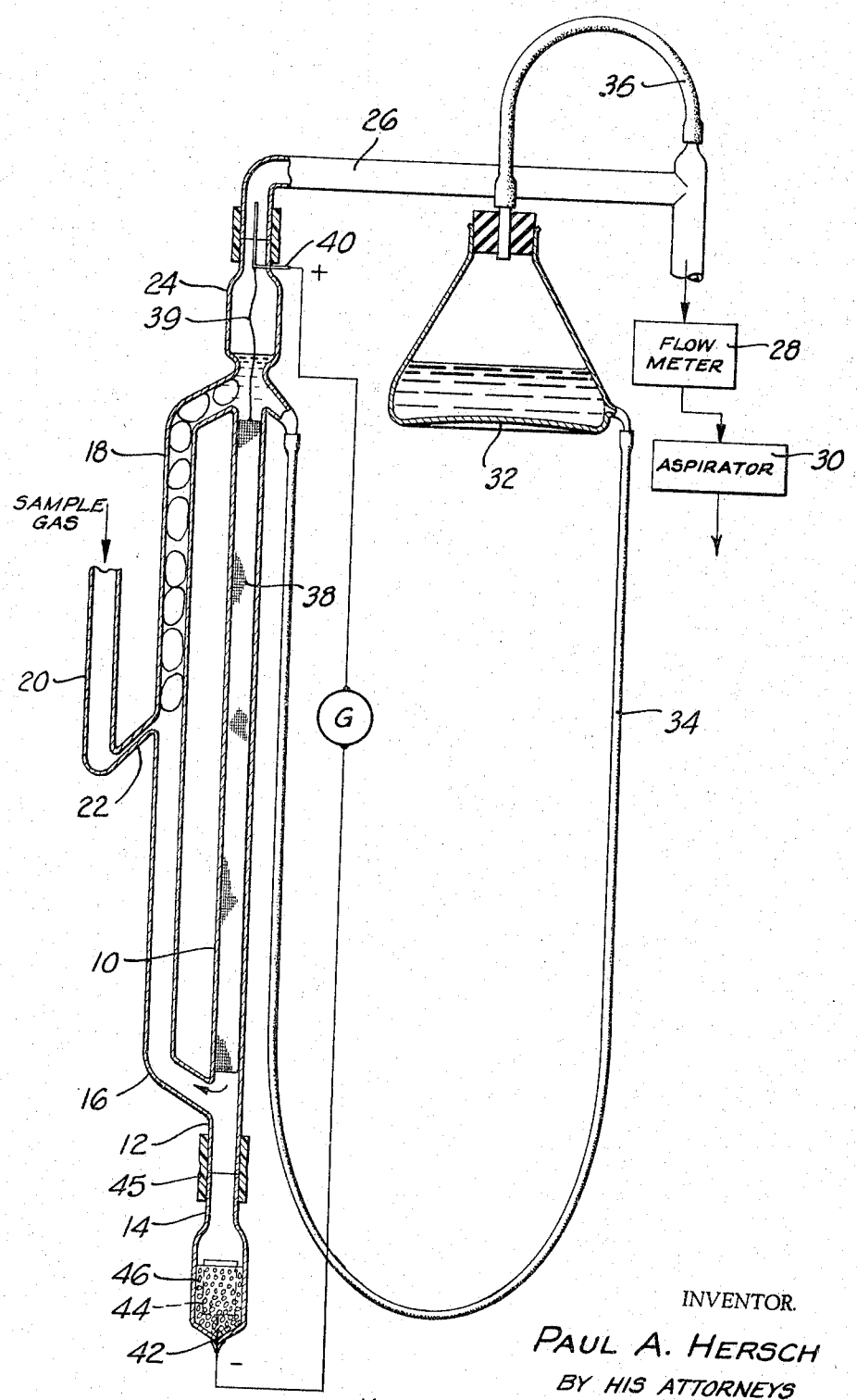

3,314,864
GAS ANALYSIS
Paul A. Hersch, Fullerton, Calif., assignor to Beckman Instruments, Inc., a corporation of California
Filed June 11, 1964, Ser. No. 375,421
26 Claims. (Cl. 204—1)

This application is a continuation-in-part of my co-pending application Ser. No. 233,357, filed Oct. 26, 1962, now abandoned, assigned to the same assignee as the present application.

This invention relates to gas analysis and more particularly to an improved galvanic monitoring process, apparatus and electrolytic composition. The method of the invention is particularly suitable to the determination of an oxidizing species, such as ozone, or other species of a gas stream which either produce or consume free halogen, and to the monitoring of halogen itself. The process and apparatus may be adapted to the continuous analysis of reducing species and olefins.

A number of methods are presently known by which ozone is continuously analyzed through liberation of halogen from halide; for example, iodine from iodide, followed by photometric or amperometric measurement of the halogen.

A commercial non-galvanic ozone monitoring cell now being manufactured makes use of the basic reaction of ozone with potassium iodide of an electrolytic solution to produce free halogen in accordance with the following equation:

(1) $\quad 2KI + O_3 + H_2O \rightarrow 2KOH + I_2 + O_2$

At a platinum cathode of the cell, the free iodine of the electrolyte solution is reduced to iodide, (2) $\quad I_2 + 2e \rightarrow 2I^-$ and at a platinum anode the iodine is reformed, (3) $\quad 2I^- - 2e \rightarrow I_2$ It will be appreciated that the regeneration of the iodine at the anode forestalls the recirculation of the electrolyte. In the foregoing cell, the problem of preventing the return of the re-formed iodine from the anode to the cathode is accomplished by providing for continuous flow of the electrolyte from cathode to anode, the flow thus acting as a barrier. The volume of electrolytic solution used is reduced to a minimum by flowing a thin film down the surface of a glass rod about which the platinum cathode is wrapped as a fine wire. In the amperometric monitoring cell of this type, it is necessary that a cathodic potential be applied. Ozone picked up by the electrolyte solution produces iodine, which, being cathodically reducible, permits an electric current to flow. Thus, the current measures the rate of arrival of ozone. The electrolyte solution following its contact with the cathode and anode flows to waste. The gas stream being monitored is in direct contact with the flowing film throughout its passage through the cell.

The foregoing ozone monitoring cell requires a continuous feeding of solution and it has proven troublesome to maintain the required thin film of electrolyte cascading over the cathode. Another disadvantage of the device is its requirement for an applied voltage and the necessity from time to time to replace the voltage source.

The method of the invention, being galvanic, no longer requires the application of an external electromotive force and there is no need for continual or intermittent renewal of the electrolyte. The conversion of the ozone into current is determined solely by Faraday's law and not by geometry of the cell or by temperature. There is no need for calibration nor for the provision of a standardized source of ozone. The electrolyte may be used indefinitely, thus avoiding a reagent dispensing pump, reagent storage and a spent electrolyte trap.

In a preferred embodiment of the method of the invention, there is utilized a galvanic cell with a cathode of inert conductive material, an active carbon anode, and a neutral buffered solution of halide as the electrolyte. It is an important feature of the invention that the anode is of a chemically reactive material, that is it must participate in the chemical reaction occurring in the cell and not merely conduct electrically. In other forms of the apparatus of the invention, a silver or mercury anode is employed.

In the cell of the invention, the reaction taking place between the ozone of the gas stream being monitored and the bromide or other halide of the electrolyte may be written (4) $\quad O_3 + 2Br^- \rightarrow O_2 + O^{--} + Br_2$ The reaction occurring at the cathode with the bromine of the electrolyte may be described as (5) $\quad 2e + Br_2 \rightarrow 2Br^-$ Thus, it is seen there is a regeneration of the bromide of the electrolyte which permits the recirculation of the electrolyte for mixing with a further amount of the gas stream monitored. In the ozone monitor now commonly employed, there is an oxidation of the regenerated halide to produce halogen at the anode, making the electrolyte unsuitable for recirculation. This does not occur in the active carbon anode-inert conductive cathode galvanic cell of the invention as at the anode the following reaction occurs:

(6) $\quad ..C + O^{--} \rightarrow ..CO + 2e$ where the ..CO symbol represents an oxygen-chemisorbate. The net effect of reactions (4), (5) and (6) is the oxidation of carbon by one of the oxygen atoms of the ozone molecule. Diatomic oxygen does not interfere though in air it may be ten million times more abundant than ozone. Since the current signal is proportionally related to the rate of supply of ozone by Faraday's constant, temperature changes and cell geometry have no effect, and no calibration with a standardized source of ozone is needed.

The concept of the invention is applicable to the determination, continuous or batchwise, of other species which either produce or consume free halogen and to halogen itself. For example, in a galvanic cell of the invention utilizing a bromide electrolyte, chlorine in the gas stream being monitored oxidizes the bromide providing a proportionally like amount of bromine. Bromine itself in the entering sample gas stream would be absorbed into the bromide electrolyte and on circulation to the cathode would be reduced to bromide, providing the desired signal.

The cell of the invention is also applicable to the continuous analysis of reducing species and of olefins in the gas stream being monitored. In such application, the gas stream would be provided with a constant background of ozone or other suitable oxidizing species. The ozone may be generated photochemically, by silent discharge, or by electrolysis. A reducing species carried by the gas stream would depress the level of the ozone and therefore the galvanic output of the cell. A transiently emerging reducing species would generate a negative peak in the recording, of an area stoichiometrically related to the quantity of this species. The cell may thus serve as a selective and highly sensitive detector for gas chromatography. The carrier stream leaving the gas chromatographic column may be made to converge with a stream of ozonized air, and the mixed stream passed into the galvanic cell of the invention. It will be appreciated that the oxidzing species, e.g. ozone, will be added in a constant and larger amount than the anticipated amount of the reducing species. It is also possible to first mix the carrier stream leaving the column with air and to irradiate the reducing species and oxygen together.

The cell of the invention is also applicable to the continuous monitoring of acid vapors in a gas stream. In such case, the gas stream is introduced into the cell of the invention containing an unbuffered electrolyte which contains iodate and iodine. Tri-iodide is temporarily liberated when the gas stream reacts with the electrolyte and is reduced when it reaches the cathode, while the active carbon anode undergoes anodic oxidation. The current output generated by this process is coulometrically related to the supply of acid to the cell.

In order to obtain a 100% coulometric yield, it is essential that the gas stream containing the ozone or other oxidizing species be brought into contact with the halide solution without encountering any metal. The "free halogen" resulting from the reaction of the ozone with the halide is then transported to the cathode. The cathode thus receives only the reaction products of the ozone, not ozone itself, in order that no portion of the ozone be destroyed through a catalytic side reaction. It is now known that ozone may be catalytically decomposed upon direct contact with an inert conductive cathode to give free oxygen. When this occurs no current results from the event. It is thus necessary that the ozone be dissolved in the electrolyte and employed to oxidize the halide of the electrolyte solution to provide free halogen, which is then reduced back to the halide at the cathode, generating two faradays per mole ozone.

In a preferred embodiment of the apparatus of the invention, there is provided a special compartment for the dissolution and chemical reaction of the ozone or other oxidizing species, separate from and preceding the cathode and anode compartments. Provision is had for cycling the electrolyte solution between the dissolution-chemical compartment and the cathode compartment. The dissolution-chemical compartment must provide sufficient interface between the gas stream being monitored and the liquid electrolyte, and there must be sufficient turbulence to insure complete translation of the ozone into free halogen. The cathode must be large enough in area and of proper configuration to catch and convert to halide all the free halogen developed during a single passage of the electrolyte along the cathode surface.

The gas stream being monitored preferably provides the pumping action necessary to cycle the electrolyte solution between the dissolution-chemical compartment and the cathode compartment. The dissolution-chemical compartment may take the form of a narrow tube, into which the gas stream is injected as a jet, forming a chain of gas bubbles, the links being separated by short slugs of liquid as illustrated in the drawing. During the upward movement of the gas chain, the bubble/solution interface renews itself continually and turbulently, ensuring an efficient transfer of ozone into the electrolyte solution. Once dissolved, the ozone reacts almost instantaneously with the halide. The bubble chain must be of sufficient length, depending on the volume of gas and cross section of the tube, to ensure that at the upper end of the tube where the gas and liquid separate, all the ozone has dissolved and reacted. The concept of a circulating electrolyte stream and gas lift propulsion of the stream may be incorporated in other galvanic cells where the chemistry permits.

The gas leaving the apparatus must not only be free of ozone, but also must not carry off any free halogen. After separating the gas stream from the electrolyte solution, the solution descends along the cathode which preferably is housed in an upright, elongated, cathode compartment. The cathode may take various forms including a filigree network or a tightly rolled scroll of a noble metal gauze, such as platinum gauze or screen. The cathode may also be an inactive carbonaceous fibrous material such as graphite cloth or graphite felt which is much less expensive than platinum. In the case of carbonaceous fibrous materials, such materials may be provided with a catalytically active metal. For example, the graphite cloth or felt could be impregnated or coated or otherwise provided with a metal such as platinum. The electrolyte solution descends or filters along the length of the cathode.

In a cell employing a silver or mercury anode rather than the carbon anode of the preferred embodiment, the anodic reacton involves the oxidation of silver to silver halide or mercury to mercurous halide which are insoluble in the electrolyte and therefore remove the free halogen therefrom. This does not interfere with the re-circulation of the electrolyte. The gas stream being monitored may be employed to provide the pumping action required to cycle the electrolyte solution to the cathode compartment.

The anode of the apparatus of the invention may take various forms. In one embodiment of the invention, it consists of a platinum screen buried in a bed of active carbon, the platinum screen being incorporated in the structure to improve conductivity. The anode may also take the form of a body of carbonaceous fibrous material which is active, or inactive but impregnated with particles of active carbon, silver, or mercury. In these cases, electrical conduction externally of the anode would require only the imbedding of a wire in the fibrous material. At very high levels of ozone, when the current drain is high, a silver or mercury screen anode, employing no carbon, is more suitable. The ability of an active carbon anode to oxidize is limited and the anode may reach this limit early in continuous use if the drain is excessive. A silver or mercury anode, for all practical purposes, never gives out. The use of a silver or mercury anode has the disadvantage, however, that high background readings are generated by the cell which do not occur when active carbon is used as the anode. The anode is located in a compartment, disposed below the cathode compartment, away from the main circulating stream of the electrolyte. The electrolyte surrounding the anode has substantially the same composition as the moving part of the electrolyte solution. The cathode and anode are connected to a galvanometer or galvanometer-recorder, or to a resistor with means to measure or record the voltage drop across it developed by the galvanic current.

A preferred embodiment of the apparatus of the invention suitable for the practice of the improved monitoring process is illustrated in the single figure of the accompanying drawing.

The apparatus which is made of glass includes a cell or receptacle having an elongated upright cathode section or compartment 10 which at its lower end is connected through a downwardly extending stem 12 to a recessed anode section or compartment 14. The cathode compartment 10 of the receptacle at its upper and lower ends respectively connects through lateral openings to a conduit loop 16 which includes an upright gas lift or bubble chain tube 18. A sampling duct 20 connects through a reduced cross section 22 to a lower portion of the gas lift tube 18. The apparatus immediately above the juncture of the gas lift tube 18 and the upper end of the cathode compartment 10 is provided with a gas-liquid separation compartment 24. The upper end of the separation compartment 24 is coupled to a conduit 26 which connects in series to a flow meter 28 and aspirator 30.

With continuous operation, the sample gas stream will evaporate some water from the electrolyte. For example, a gas stream of 100 ml./minute of a completely dry gas will remove about 0.1 ml. water/hour at 20° C., and more at higher temperatures in proportion to the higher vapor pressure of the water. Since in a representative cell of the circulating electrolyte type the volume of the electrolyte may be only about 10 ml., the loss of water may be serious after less than a day of operation.

The water make-up is achieved by a means consisting of a wide reservoir 32 communicating through several feet of a small diameter (e.g. 1 mm. bore) flexible plastic tubing 34 with the cell electrolyte at an upper portion of the cathode compartment 10. The long narrow path hinders the diffusion of the salts from the cell into the water reservoir 32. Such a diffusion would result in a progressive dilution of the cell electrolyte. Any salt entering the plastic tubing 34 will in time be washed back into the cell by water from the reservoir 32 flowing towards the cell to replace the evaporation loss.

Since in most cases suction will be applied at the cell exit, the air above the make-up water in the reservoir 32 must be kept under the same subatmospheric pressure. This is the function of the line 36 extending between the air space of the reservoir 32 and the conduit 26. When the apparatus is not in use, or in use for only a short period, the flexible thin tubing 34 should be pinched off by a pinch cock.

The cathode compartment 10 houses a cathode 38 made of screen, of a noble metal, preferably platinum, rolled up like a carpet to the configuration of a scroll. The cathode may also be a porous body or a scroll of carbonaceaus fibrous material as described before. A platinum wire 39 is attached at one end to the platinum screen electrode 38 and at its other end to a terminal platinum wire 40 fused into the glass near the exit of the cell. It will be noted that the cathode is completely submerged in electrolyte, thus forestalling any direct contact of the gas stream and cathode.

The anode compartment 14 has the shape of a bottle and carries a fused-in platinum wire 42. It is highly desirable that the anode is not disturbed by the circulating electrolyte; this becomes possible with the design of the invention. In the particular embodiment illustrated a small rectangular piece of platinum screen 44, loosely scrolled, is placed inside the anode compartment 14 and attached to the fused-in wire 42. A paste of active carbon 46 made by working finely divided carbon into cell electrolyte fills the major portion of the anode compartment 14, with the screen 44 almost buried. It has been found desirable to have a small portion of the screen 44 emerging from the carbon bed to facilitate the escape of hydrogen should a cathodic "charging" of the carbon become desirable after prolonged use. Without an emerging area of the platinum screen 44, hydrogen bubbles may disrupt the carbon bed during such charging. The part of the anode compartment 14 not occupied by carbon is filled with cell electrolyte and the bottle-like compartment is attached to the stem 12 by a Tygon sleeve 45. Tygon, a modified halide polymer, is permissible at this site because normally no free iodine will proceed thus far.

The carbon used should have a large, reactive surface and the particles when forming a bed without compression should have enough contact with each other to ensure conductive continuity throughout the bed.

The active carbon anode, unlike the silver or mercury anodes which may be employed in alternative embodiments of the apparatus, offers only a limited ampere-hour capacity of performance, because the number of accessible active sites on the carbon surface is limited. With silver, which is progressively etched and acquires a very pervious coat of halide, new metallic surface is continually created, so that the life of a silver anode is practically unlimited. The active carbon anode, however, may be rejuvenated by a cathodic charging, thus reducing the surface oxygen or surface hydroxyl. In carrying out such a charging operation, the electrolyte should preferably be stagnant and a wick immersed into it to a depth of a few millimeters near the exit end of the apparatus, to connect with an external auxiliary anode system (not shown in the drawing), e.g. a platinum wire in a test tube with an electrolyte, e.g. a solution of sodium nitrate. After a charging operation, the carbon may be in an overactive form and for a period of time will generate a relatively high background reading from the reduction of oxygen. This background will ultimately die down.

For the monitoring of streams of high ozone concentrations, it is best to employ a large mass of active carbon to delay the need of charging, or alternatively a silver anode. As mentioned above, a piece of silver screen or mercury will last nearly indefinitely.

A preferred electrolyte composition comprises:

| | Mol/Liter of solution | Grams/Liter of solution |
|---|---|---|
| Iodide | 0.001 NaI | 0.15 |
| Bromide | 3 NaBr | 300 |
| Dihydrogen phosphate | 0.1 NaH$_2$PO$_4$·H$_2$O | 14 |
| Monohydrogen phosphate | 0.1 Na$_2$HPO$_4$ or Na$_2$HPO$_4$·7H$_2$O | 14 / 27 |

All of the sodium salts may be replaced by the corresponding potassium or ammonium salt. Ammonium salts are the most water soluble and would minimize the possibility of a salt crust forming at the site where the air enters the bubble chain.

The preferred electrolyte composition employs a mixture of bromide with a trace of iodide. The trace amount of iodide is a most important feature. With an electrolyte having only bromide present, the reaction with ozone in the bubble chain of the gas lift tube is normally not fast enough to prevent some ozone from reaching the cathode in the case of a moderately sized gas lift tube. With a high concentration of iodide present and in the absence of bromide, the yield is high, owing to the larger driving force which causes the ozone to oxidize iodide, as compared with bromide. However, at high iodide levels, the side reaction of iodide with oxygen becomes noticeable, causing a high background. At low iodide levels, the yield may be below the theoretical maximum. It has been discovered that a trace of iodide with an appreciable concentration of bromide gives the best results. The iodide salt is preferably present in an amount of 0.0005 to 0.002 mol/liter with 1–5 mol/liter of the bromide salt. It was also discovered that a trace of iodide (for example, 0.001 M per liter) without bromide, but in presence of a high concentration (1 to 5 M) of chloride or nitrate, also gives fast response and a high coulombic yield. In the case of the nitrate addition, the role of the intermediary halogen is played entirely by the trace of iodide. Nitrate presumably assists by imparting to the solution a high ionic strength. Other inert salts, such as sulfates, may be used to give the solution ionic strength.

If the electrolyte is allowed to become alkaline, the yield decreases. It is therefore desirable to buffer off the local alkalinity which would otherwise develop at the platinum cathode and which would raise the pH of the circulating portion of the electrolyte. The pH should be kept around the neutrality point and to this end buffering salts are incorporated in the electrolyte. A low pH would cause the cell to be noticeably responsive to nitrogen dioxide.

The apparatus of the drawing is desirably made from borosilicate type glass. It is important that all parts of the sampling ducts be clean. Preferably, they should be made of smooth glass. Where junctions are unavoidable, they should be formed of glass abutting to glass, with Tygon sleeves. Teflon ducts are found to destroy ozone when new. It is also important that the electrolyte, prior to arriving at the cathode, should not have contact with any material absorbing or adsorbing the iodine or other halogen, or reacting with it. Metal, rubber, Tygon, and ground glass surfaces should not be used in those parts of the apparatus which carry free halogen, which parts should preferably be made entirely of smooth glass.

Although exemplary embodiments of the invention have been disclosed herein for purposes of illustration, it will be understood that various changes, modifications, and substitutions may be incorporated in such embodiments without departing from the spirit of the invention as defined by the claims which follow.

What is claimed is:

1. In a galvanic monitoring process for determining a species in a sample gas stream that oxidizes a halide, the steps comprising:
conveying said gas stream into a body of aqueous halide electrolyte having immersed therein a cathode of inert conductive material and an anode of active carbon, whereby said oxidizing species in said gas stream reacts with halide ions resulting in the formation of free halogen and said halogen is subsequently reduced at said cathode to halide ions and, therefore, the halide ions formed at the cathode are available for reaction with additional oxidizing species in the sample gas stream; and
measuring the current across said electrodes without driving a current through said electrodes from an external electrical power source whereby the current measured is a function of the rate of entry of said oxidizing species into the electrolyte.

2. In a galvanic monitoring process for determining a species in a sample gas stream that oxidizes a halide, the steps comprising:
conveying said gas stream into a body of aqueous halide electrolyte to cause the oxidizing species in said gas stream to react with halide ions resulting in the formation of free halogen;
directing the electrolyte containing free halogen to a cathode formed of inert conductive material so as to reduce the free halogen to halide ions, while maintaining said electrolyte in contact with an anode of active carbon; and
measuring the current across said electrodes without driving a current through said electrodes from an external electrical power source whereby the current measure is a function of the rate of entry of said oxidizing species into the electrolyte.

3. A process as set forth in claim 2 including the step of separating the gas stream from the electrolyte prior to directing the electrolyte containing free halogen to said cathode.

4. In a galvanic monitoring process for determining a species in a sample gas stream that oxidizes a halide, the steps comprising:
conveying said gas stream into a zone in a body of aqueous electrolyte so as to create a liquid stream in said body and to cause the oxidizing species in said gas stream to react with the halide ions resulting in the formation of free halogen;
directing the liquid stream, after the oxidizing species is reduced, over a cathode formed of inert conductive material so as to reduce the free halogen to halide ions, while maintaining said electrolyte in contact with an anode of active carbon;
directing the liquid stream from the cathode back to said zone so as to complete a circular motion; and
measuring the current across said electrodes without driving a current through said electrodes from an external electrical power source whereby the current measured is a function of the rate of entry of said oxidizing species into the electrolyte.

5. In a galvanic monitoring process for determining a species in a sample gas stream that oxidizes a halide, the steps comprising:
conveying said gas stream into a zone in a body of aqueous electrolyte so as to create a liquid stream in said body and to cause the oxidizing species in said gas stream to react with the halide ions resulting in the formation of free halogen;
venting said gas stream from the liquid stream;
directing the liquid stream, after the oxidizing species is reduced and the gas stream has been vented therefrom, over a cathode formed of inert conductive material so as to reduce the free halogen to halide ions, while maintaining said electrolyte in contact with an anode of active carbon; and
measuring the current across said electrodes without driving a current through said electrodes from an external electrical power source whereby the current measured is a function of the rate of entry of said oxidizing species into the electrolyte.

6. In a galvanic monitoring process for determining a species in a sample gas stream that oxidizes a halide, the steps comprising:
providing an upright cell containing a cathode of inert conductive material in the upper portion thereof and an anode of active carbon in the lower portion thereof, both of said electrodes being in contact with a pool of aqueous halide electrolyte in the cell;
providing a gas lift zone communicating at its upper and lower ends with a portion of said cell adjacent said cathode and with a portion of said cell between said electrodes, respectively;
introducing the gas stream into said gas lift zone away from its upper end to induce circulation of electrolyte upwardly toward the upper portion of said cell downwardly through said cell and back to said lift zone; and
measuring the current across said electrodes without driving a current through said electrodes from an external electrical power source.

7. A process as set forth in claim 1 wherein the gas stream contains ozone.

8. A process as set forth in claim 1 wherein the gas stream being monitored contains a reducing species and to which gas stream there is added a constant and larger amount of said oxidizing species, said oxidizing species and reducing species interacting to provide a net surplus of the oxidizing species indicative of the reducing species present in the gas stream.

9. A process in accordance with claim 1 wherein the halide salt is a mixture of a bromide salt and an iodide salt and wherein the cation of said salts is selected from the group consisting of sodium, potassium and ammonia, said iodide salt being present in the amount of .0005 to .002 mol/liter and the bromide salt in the amount of 1 to 5 mol/liter.

10. In a galvanic cell, the combination comprising:
a cell adapted to contain a body of liquid;
a cathode formed of inert conductive material disposed within said cell;
an anode of active carbon spaced from said cathode within the cell; and
circuit means connected to said electrodes, said circuit means being devoid of an electrical power source associated therewith other than said electrodes for driving a current through said electrodes.

11. A galvanic cell as set forth in claim 10 wherein said cathode is selected from the group consisting of a noble metal and inactive carbon.

12. A galvanic cell as set forth in claim 10 wherein said cathode is formed of platinum.

13. A galvanic cell as set forth in claim 10 wherein said cathode is formed of an inactive carbonaceous fibrous material.

14. In a galvanic cell for monitoring of a gas stream, the combination comprising:
a cell adapted to hold a body of electrolyte, said cell forming a substantially continuous, closed conduit means allowing circulation of said electrolyte;
said conduit means having, in series, means for introducing the gas stream into said conduit, a section of sufficient length to permit the dissolution of the gas stream in the electrolyte, and a cathode of inert conductive material; an anode of active carbon in said cell; and
circuit means connected to said electrodes, said circuit means being devoid of an electrical power source associated therewith other than said electrodes for driving a current through said electrodes.

15. A galvanic cell as set forth in claim 14, including gas venting means in said conduit means between said section and said cathode for separating the gas stream from the electrolyte.

16. In a galvanic cell for monitoring of a gas stream, the combination comprising:
a receptacle adapted to hold a body of electrolyte, said receptacle having a substantially closed conduit portion for allowing circulation of said electrolyte; said conduit portion having, in series, means for introducing the gas stream into said conduit portion, a section of sufficient length to permit the dissolution of the gas stream into the electrolyte and a cathode of inert conductive material;
an anode of active carbon in said receptacle outside said conduit portion but connected thereto between said cathode and said gas introducing means; and
means for connecting the anode and the cathode to a current measuring means.

17. In a galvanic cell for monitoring of a gas stream, the combination comprising:
a receptacle adapted to hold a body of electrolyte, said receptacle having a substantially closed conduit portion for allowing circulation of said electrolyte; said conduit portion having, in series, means for introducing the gas stream into said conduit portion, a section of sufficient length to permit the dissolution of the gas stream into the electrolyte, gas venting means for separating the gas stream from the electrolyte and a cathode of inert conductive material;
an anode of active carbon in said receptacle outside said conduit portion but connected thereto between said cathode and said gas introducing means; and
means for connecting the anode and the cathode to a current measuring means.

18. In a galvanic cell for monitoring of a gas stream, the combination comprising:
an elongated upright cell adapted to hold a body of liquid, said cell having lateral openings adjacent its opposite ends;
a gas lift tube connected at its upper and lower ends to respective ones of the lateral openings of the upright cell;
means for introducing the gas stream being monitored to the gas lift tube;
a cathode of inert conductive material positioned in the upper portion of said cell;
an anode of active carbon positioned in the lower portion of said cell; and
circuit means connected to said electrodes, said circuit means being devoid of an electrical power source associated therewith other than said electrodes for driving a current through said electrodes.

19. In a galvanic cell for monitoring of a gas stream, the combination comprising:
a cell adapted to hold a body of liquid, said cell having an elongated upright cathode section having lateral openings at its opposite ends and an anode section in communication with the cathode section and spaced therebelow;
a gas lift tube connected at its upper and lower ends to respective ones of the lateral openings of the upright cathode section;
means for introducing the gas stream being monitored to a lower section of the gas lift tube, thereby bringing about a circulation of the electrolyte upwardly within the tube to the upper lateral opening of the cathode section, downwardly through said cathode section and returning to the bottom of the gas lift tube through the other lateral opening;
a cathode of inert conductive material positioned in said cathode section of the cell;

an anode of active carbon located within said anode section; and
circuit means connected to said electrodes, said circuit means being devoid of an electrical power source associated therewith other than said electrodes for driving a current through said electrodes.

20. A galvanic cell as set forth in claim 19 wherein said cathode is elongated and extends lengthwise in said cathode section of the cell.

21. In a galvanic cell for monitoring of a gas stream, the combination comprising:
a receptacle adapted to hold a body of liquid;
a cathode of inert conductive material disposed within an upright section of said receptacle;
an anode of active carbon within the receptacle spaced from said cathode and away from the upright section;
a gas lift conduit connected at its upper and lower ends to the respective upper and lower ends of said upright section of the receptacle;
means for introducing the gas stream being monitored to a lower section of the gas lift conduit; and
circuit means connected to said electrodes, said circuit means being devoid of an electrical power source associated therewith other than said electrodes for driving a current through said electrodes.

22. In a galvanic cell for monitoring of a gas stream, the combination comprising:
a cell adapted to hold a body of electrolyte, said cell including a substantially continuous, closed conduit means allowing circulation of said electrolyte;
said conduit means having, in series, means for introducing the gas stream into said conduit, a section extending above said gas introducing means of sufficient length to permit the dissolution of the gas stream in the electrolyte, gas venting means for separating the gas stream from the electrolyte and a cathode of inert conductive material; an anode selected from the group consisting of silver and mercury in said cell, but outside said conduit means; and
means for connecting the anode and the cathode to a current measuring means.

23. An aqueous electrolyte composition for use in a galvanic cell employing an inert conductive cathode and an anode selected from the group consisting of active carbon, silver and mercury, said composition comprising:
a mixture of a bromide salt and an iodide salt with the iodide salt being present in the amount of .0005 to .002 mol per liter and the bromide salt in the amount of 1–5 mol per liter, the cation of said salts being selected from the group consisting of sodium, potassium and ammonia.

24. In a galvanic cell for monitoring a gas stream, the combination comprising:
a cell adapted to hold a body of liquid, said cell having an elongated upright cathode section having lateral openings at its opposite ends and an anode section in communication with the cathode section and spaced therebelow;
a gas lift tube connected at its upper and lower ends to respective ones of the lateral openings of the upright cathode section;
means for introducing the gas stream being monitored to a lower section of the gas lift tube, thereby bringing about a circulation of the liquid upwardly within the tube to the upper lateral opening of the cathode section, downwardly through said cathode section and returning to the bottom of the gas lift tube through the other lateral opening;
a cathode of inert conductive material positioned in said cathode section of the cell;
an anode selected from the group consisting of silver and mercury located within said anode section; said cathode being positioned below the upper one of said lateral openings in said cell;

gas venting means in said cathode section above said upper one of said lateral openings; and means for connecting the two electrodes to a current measuring means.

25. A galvanic cell as set forth in claim 10 wherein said circuit means includes current measuring means for measuring the current generated across said electrodes.

26. In a galvanic cell for monitoring a gas stream, the combination comprising:

a cell adapted to hold a body of liquid, said cell having an elongated upright cathode section having lateral openings at its opposite ends and an anode section in communication with the cathode section and spaced therebelow;

a gas lift tube connected at its upper and lower ends to respective ones of the lateral openings of the upright cathode section;

means for introducing the gas stream being monitored to a lower section of the gas lift tube, thereby bringing about a circulation of the electrolyte upwardly within the tube to the upper lateral opening of the cathode section, downwardly through said cathode section and returning to the bottom of the gas lift tube through the other lateral opening;

a cathode of inert conductive material positioned in said cathode section of the cell;

an anode of active carbon located within said anode section;

said cathode being positioned below the upper one of said lateral openings in said cell;

gas venting means in said cathode section above said upper one of said lateral openings; and means for connecting the two electrodes to a current measuring means.

References Cited by the Examiner

UNITED STATES PATENTS

| | | | |
|---|---|---|---|
| 2,000,815 | 5/1935 | Berl | 204—294 |
| 2,681,887 | 6/1954 | Butler | 204—294 |
| 3,022,241 | 2/1962 | Jessop | 204—195 |
| 3,028,317 | 4/1962 | Wilson et al. | 204—195 |
| 3,038,848 | 6/1962 | Brewer et al. | 204—195 |
| 3,050,371 | 8/1962 | Dowson et al. | 204—195 |
| 3,098,813 | 7/1963 | Beebe et al. | 204—195 |
| 3,117,034 | 1/1964 | Tirrell | 136—86 |
| 3,131,133 | 8/1964 | Barendrecht | 204—195 |
| 3,188,242 | 6/1965 | Kordesch et al. | 136—86 |
| 3,196,100 | 7/1965 | Digby | 204—195 |
| 3,223,608 | 12/1965 | Hersch | 204—195 |
| 3,236,759 | 2/1966 | Robinson | 204—195 |

FOREIGN PATENTS

| | | |
|---|---|---|
| 1,235,331 | 5/1960 | France. |
| 521,773 | 5/1940 | Great Britain. |
| 707,323 | 4/1954 | Great Britain. |

OTHER REFERENCES

"Przemsl Chemiczny," volume 40, 1961, pages 624–626.

HOWARD S. WILLIAMS, *Primary Examiner.*

WINSTON A. DOUGLAS, *Examiner.*

JOHN H. MACK, T. H. TUNG, *Assistant Examiners.*